US007179992B1

(12) United States Patent
Packard et al.

(10) Patent No.: US 7,179,992 B1
(45) Date of Patent: Feb. 20, 2007

(54) DEVICE WITH TAMPER RESISTANT SHUTTERS

(75) Inventors: Thomas N. Packard, Syracuse, NY (US); Dejan Radosavljevic, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 331 days.

(21) Appl. No.: 10/900,778

(22) Filed: Jul. 28, 2004

Related U.S. Application Data

(63) Continuation-in-part of application No. 10/729,685, filed on Dec. 5, 2003, which is a continuation-in-part of application No. 10/645,359, filed on Aug. 21, 2003, now Pat. No. 6,969,801.

(51) Int. Cl.
*H01R 13/46* (2006.01)
(52) U.S. Cl. .......................... 174/53; 174/58; 439/106; 361/42
(58) Field of Classification Search ................ 174/53, 174/58; 439/106, 107, 535; 385/76, 92; 361/42–51; 335/165–176, 6, 18
See application file for complete search history.

(56) References Cited

U.S. PATENT DOCUMENTS

| | | | |
|---|---|---|---|
| 4,484,021 A | 11/1984 | Schaefer et al. | |
| 4,529,834 A * | 7/1985 | Nattel | 174/53 |
| 4,544,219 A | 10/1985 | Barkas | |
| 4,567,544 A | 1/1986 | Ronemus et al. | |
| 4,749,360 A | 6/1988 | Dudley et al. | |
| 4,867,694 A | 9/1989 | Short | |
| 5,006,075 A | 4/1991 | Bowden, Jr. | |
| 5,020,997 A | 6/1991 | Calderara et al. | |
| 5,053,591 A | 10/1991 | Theurer | |
| 5,281,156 A | 1/1994 | Yi | |
| 5,711,066 A | 1/1998 | Castaldo | |

(Continued)

FOREIGN PATENT DOCUMENTS

WO   WO 2004/066327   8/2004

(Continued)

*Primary Examiner*—Dhiru R. Patel
(74) *Attorney, Agent, or Firm*—Daniel P. Malley; Bond, Schoeneck & King, PLLC

(57) ABSTRACT

The present invention is directed to a protection device that includes line terminals coupled to a power source disposed in an electric power distribution system. The protection device is configured to protect a portion of the power distribution system from at least one fault condition. The device includes a receptacle member that includes a housing and a cover. The cover includes receptacle openings configured to accommodate plug contact blades. Receptacle contacts are disposed in the housing. The receptacle contacts are also coupled to the line terminals to thereby establish an electrical connection between the receptacle contacts and the line terminals. Each receptacle contact is in communication with a corresponding receptacle opening. A protective shutter mechanism is integrated into the housing. The protective shutter mechanism is movable from a closed position to an open position upon insertion of the plug contact blades. The protective shutter mechanism is substantially hermetically sealed in the closed position. The protective shutter mechanism is also not movable from the closed position to the open position upon insertion of an object into only one receptacle opening, such that the object is prevented from making contact with the corresponding receptacle contact.

49 Claims, 12 Drawing Sheets

U.S. PATENT DOCUMENTS

| | | |
|---|---|---|
| 5,712,450 A | 1/1998 | Chan et al. |
| 5,863,221 A | 1/1999 | Castaldo |
| 5,932,939 A | 8/1999 | Simmons |
| 5,981,875 A | 11/1999 | Kesler et al. |
| 6,425,694 B1 * | 7/2002 | Szilagyi et al. ............... 385/76 |
| 6,494,728 B1 | 12/2002 | Gorman |
| 6,570,091 B1 | 5/2003 | Kesler et al. |
| 6,592,393 B1 | 7/2003 | Gentle |
| 6,624,990 B1 | 9/2003 | Lortscher |
| 6,688,780 B2 * | 2/2004 | Duran ......................... 385/76 |
| 6,734,769 B1 * | 5/2004 | Germain et al. ............... 335/6 |
| 6,873,231 B2 | 3/2005 | Germain et al. |
| 6,884,111 B2 * | 4/2005 | Gorman ...................... 439/535 |
| 6,949,994 B2 | 9/2005 | Germain et al. |
| 6,963,260 B2 | 11/2005 | Germain et al. |
| 7,026,895 B2 | 4/2006 | Germain et al. |
| 2004/0212466 A1 | 10/2004 | Germain et al. |
| 2005/0162789 A1 | 7/2005 | Germain et al. |
| 2006/0022777 A1 | 2/2006 | Germain et al. |
| 2006/0055490 A1 | 3/2006 | Germain et al. |

FOREIGN PATENT DOCUMENTS

WO     WO 2004/070906     8/2004

* cited by examiner

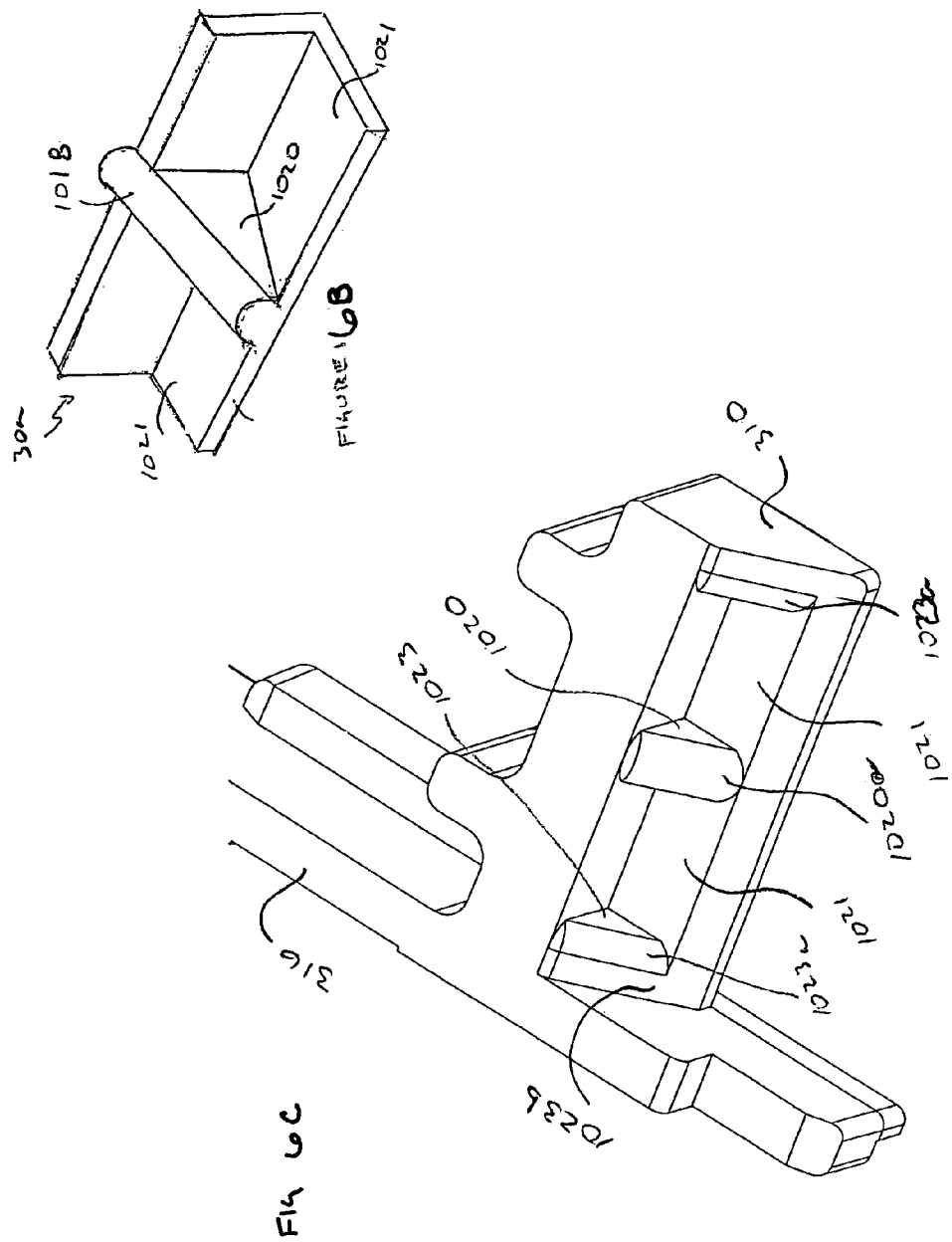

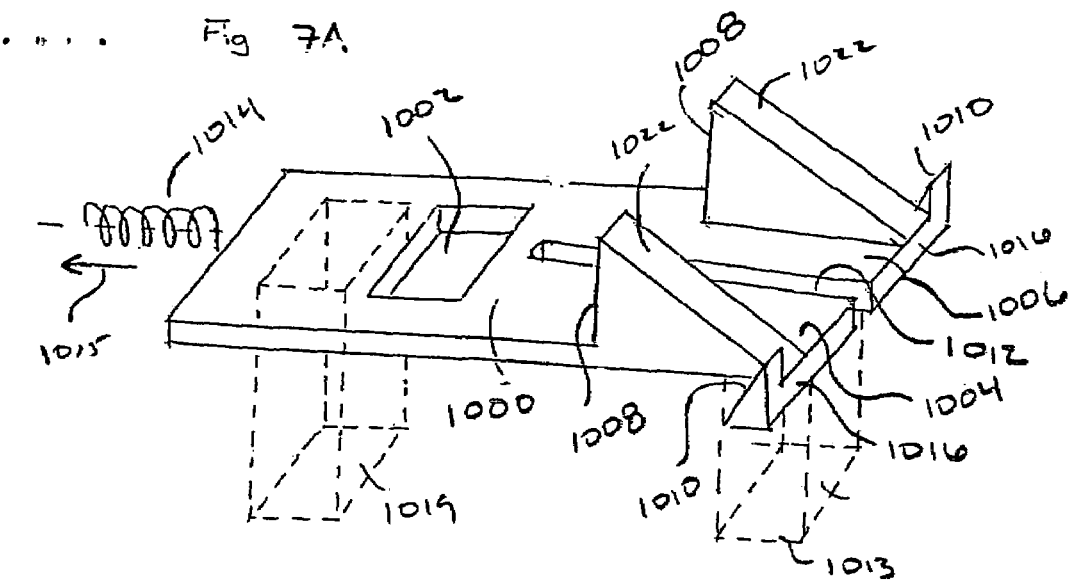
Fig 7A.
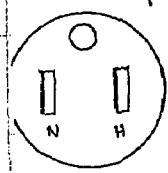
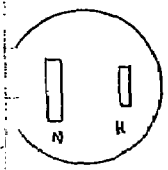
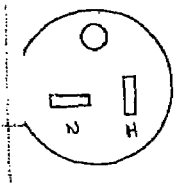
Fig 7B
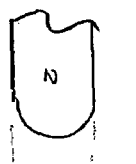
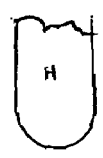
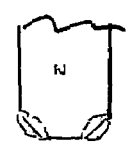
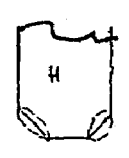
FIGURE 7C
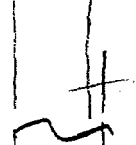
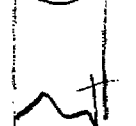
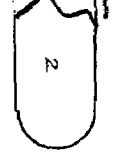

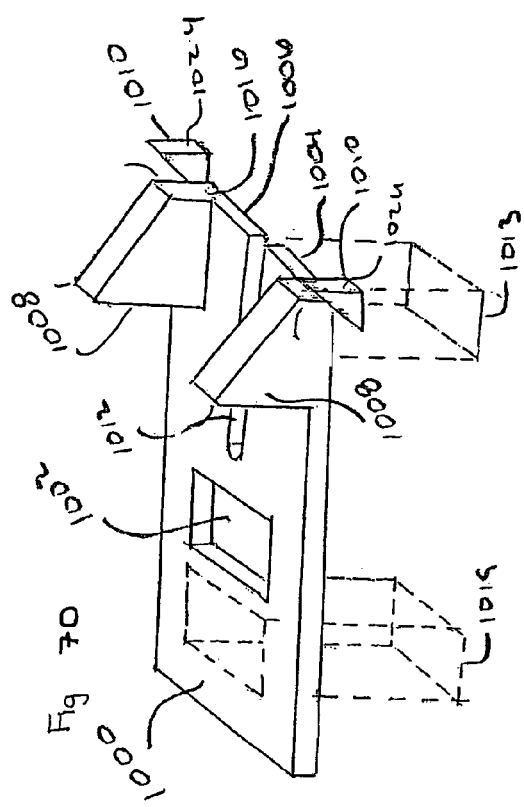
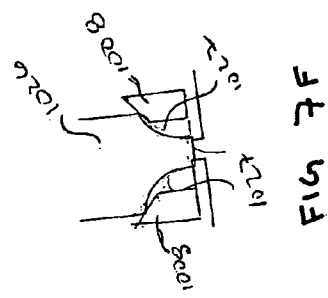
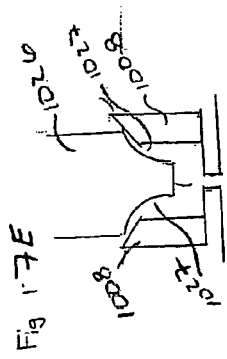

DEVICE WITH TAMPER RESISTANT SHUTTERS

CROSS REFERENCE TO RELATED APPLICATIONS

This application is a continuation-in-part of U.S. patent application Ser. No. 10/729,685 entitled "A Protective Device with Tamper Resistant Shutters" filed on Dec. 5, 2003 and a continuation-in-part of U.S. patent application Ser. No. 10/645,359 entitled "A Shuttered Receptacle for a protective device, filed on Aug. 21, 2003 now U.S. Pat. No. 6,969,801, the content of which are relied upon and incorporated herein by reference in their entirety, and the benefit of priority under 35 U.S.C. § 120 is hereby claimed.

BACKGROUND OF THE INVENTION

1. Field of the Invention

The present invention relates generally to electrical protection devices, and particularly to electrical protection devices with safety features.

2. Technical Background

Ground fault circuit interrupters (GFCIs), and arc fault circuit interrupters (AFCIs) are examples of protective devices in electric circuits. These devices may be disposed in a receptacle that is subsequently installed in a wall box. The receptacle has line terminals for connection to the power line, and load terminals for connection to a load. The load terminals include receptacle contacts and feed-thru terminals. The receptacle contacts are configured to accommodate the blades of a plug connector, which are inserted to provide power to a load. Feed-thru terminals, on the other hand, are configured to accommodate wires which are connected to one or more additional receptacles, known as a downstream receptacles. The downstream receptacle may include a string of downstream receptacles that comprise a branch circuit of an electrical distribution system. Each of the aforementioned protective devices have interrupting contacts for breaking the connection between the line terminals and load terminals when the protective device detects a fault condition. The connection is broken to interrupt the load current and thereby remove the fault condition. Fault conditions include those that result in risk electrocution of personnel, or fire.

There are several safety issues that heretofore have not been addressed in an integrated way. The first type of problem are fault conditions such as ground faults and arc faults that may result in electrocution or fire, respectively. The second type of problem involves the inadvertent insertion of objects, such as paper clips and screwdriver blades into the receptacle contact openings. This situation also involves an electric shock hazard. A third type of problem relates to the introduction of contaminants into the device during shipping, handling, or storage, or following installation. Contaminants such as water, corrosive compounds, particulate matter, insects, and etc. may enter the device via the receptacle contact openings. Any of these contaminants may result in the failure of the protective device.

With respect to the first problem, historical problems with these devices include the possibility of the line wires being connected to the load terminals during installation, also known as miswiring. A variety of methods have been used to prevent, or attempt to prevent, miswiring, with varying levels of success. Labels and installation instruction sheets have been used to prevent miswiring, but can be ignored by the installer. Historical problems include a defective solenoid driving device. Solenoid burn-out has been revealed by testing the protective with a test button, but the result of the test can be ignored by the user.

In one approach that has been considered, the receptacle contacts and feed-thru terminals may remain electrically connected irrespective of whether the interrupting contacts are open or closed. Should the power line be improperly connected to the feed-thru terminals, e.g., miswired, the receptacle contacts remain energized even if one of the predetermined fault conditions is present in the load that is connected to the receptacle contacts via the plug connector. One drawback to this approach is that a miswire condition results in the receptacle contacts being accessible while the fault condition persists.

In another approach that has been considered, the lack of protection to the receptacle terminals when the protective device is miswired has only been partially addressed. This approach employs a circuit that prevents interrupting contacts from remaining closed when the protective device has been miswired. Since the interrupting contacts do not remain closed, there is lack of power to the down-stream receptacles which are connected to the line terminals. Typically, the open or closed condition of the interrupting contacts are visually indicated to the user by the position of a button, indicator lamp, or audible alarm. When the visual indicator signals that the interrupting contacts are in an open condition, or there is loss of power on the downstream receptacles, the installer is thereby prompted to correct the miswired condition. This approach also has its drawbacks. If the branch circuit does not include downstream receptacles, in which case the feed-thru terminals are not used, the installer is not alerted to the miswire condition by denial of power to either the downstream branch circuit or to the receptacle contacts. Lack of protection of the receptacle contacts is only evident to the installer if the signal or absence of signal from the visual indicator is understood. Visual indication is much more easily ignored than power denial and the miswire condition may not be corrected.

There have been proposed solutions for the second problem. In one approach that has been considered, an electrical receptacle includes shuttered openings to prevent the insertion of foreign objects into the receptacle contact openings. The shutter is disposed within the receptacle housing. The shutter is configured to open only when the blades of an electrical plug are inserted into the openings. One drawback to this approach, is that the shutter is a stand-alone mechanism that is not integrated with any miswire protection feature. Another drawback is that this approach does not take into account the third problem, e.g., the shutter does not prevent the introduction of water, corrosive compounds, particulate matter, insects, and other contaminants into the device via the receptacle contact openings. Another drawback is that the shutter is not disposed within the receptacle housing and is subject to being easily removed by the user.

What is needed is means for detecting a miswire condition that may be employed in conjunction with a physical barrier that prevents insertion of a plug into the receptacle until such time as power has been properly connected to the line terminals of the protection device. What is further needed is a physical barrier that is effective in preventing the second type of hazard from occurring after the device has been properly wired. Finally, the physical barrier must prevent the introduction of water, corrosive compounds, particulate matter, insects, and other contaminants into the device via the receptacle contact openings.

A drawback related to shutters is that whereas they have been effective at preventing the insertion of a single object having a single pointed end into a blade opening, they have not been effective at blocking the insertion of dual objects, i.e., single or multiple electrically conductive objects that present two pointed ends. An example of a single object having two pointed ends is a bobby pin. An example of multiple objects having two pointed ends is two paper clips. The pointed ends of the dual object can be manipulated so as to move shutters to an open position, whereupon one or more pointed end is able to make electrical contact, whereupon a person can be exposed to injury.

Shutters can be associated with receptacles and/or protective devices. Protective devices include, and are not limited to, ground fault circuit interrupters (GFCIs) and arc fault circuit interrupters (AFCIs). If the shuttered receptacle is GFCI protected and there is an electrical current from the pointed end through a person to ground, the GFCI would interrupt the current to protect the person from electrocution. However, the person would be exposed to a painful electrical shock in the meantime. The painful shock would have been avoided had the shutters been effective in preventing the electrical contact. Another issue is when manipulation of a dual object moves shutters to an open position, allowing two pointed ends to make two electrical contacts, one inside each of two receptacle openings. The situation becomes quite hazardous if neither electrical contact is to ground since there would be no ground current for the GFCI to detect and interrupt. Since the GFCI fails to interrupt the electrical current, there is risk of electrical burns or electrocution.

What is needed is an improved shutter structure configured to permit the insertion of an electrical plug into a receptacle for the electrical coupling of a user attachable load. What is needed is an improved shutter structure configured to prevent the insertion of dual objects into the blade openings of a receptacle to make electrical contact between the dual object and a receptacle portion.

SUMMARY OF THE INVENTION

The present invention addresses the needs described above. The present invention provides an integrated protective device that includes miswire condition detector that operates in conjunction with a protective shutter. The shutter prevents insertion of a plug into the receptacle until such time as power has been properly connected to the line terminals of the protection device. The shutter is also operative after the protective device has been properly wired. The shutter is configured to open only when the blades of an electrical plug are inserted into the openings. Finally, the shutter provides a physical seal that is operative to exclude contaminants from entering the device via the receptacle contact openings.

One aspect of the present invention is directed to an electrical wiring device that includes a receptacle member having a housing and a cover. The cover assembly includes receptacle openings configured to accommodate plug blades. A plurality of receptacle contacts are disposed in the housing, a portion of which are electrically coupled to the electrical distribution system. Each of the plurality of receptacle contacts is in communication with a corresponding receptacle opening. A protective shutter mechanism is disposed within the receptacle member between the receptacle openings and the plurality of receptacle contacts. The protective shutter mechanism includes at least one shutter member configured to move between a closed position and an open position. The plurality of receptacle contacts are in communication with the receptacle openings in the open position and not in communication with the receptacle openings in the closed position. A blade detection geometry is disposed on the shutter member. The blade detection geometry is configured to engage a plug blade having predetermined dimensional characteristics and not engage objects not having the predetermined dimensional characteristics. The blade detection geometry is configured to move the shutter member to the open position when engaged with the plug blade having the predetermined dimensional characteristics and not move the shutter member otherwise.

In another aspect, the present invention is directed to an electrical wiring device including a receptacle member includes a housing and a cover, the cover including receptacle openings configured to accommodate plug contact blades. A set of receptacle contacts are disposed in the housing, each of the receptacle contacts being in communication with a corresponding receptacle opening. A plurality of line terminals are coupled to the set of receptacle contacts to thereby establish an electrical connection there between. The plurality of line terminals are configured for connection to the power distribution system.

A protective shutter mechanism is integrated into the housing. The protective shutter mechanism includes a frame member disposed in the housing. The frame member includes a first aperture aligned with one receptacle opening and a second aperture aligned with another receptacle opening. A shutter mechanism is coupled to the frame member. The shutter mechanism includes a first slide assembly corresponding to the first aperture and a second slide assembly corresponding to the second aperture. A blade detection geometry is disposed on at least one of the first slide assembly and the second slide assembly. The blade detection geometry is configured to move the shutter mechanism to the open position when both the first slide assembly and the second slide assembly are simultaneously engaged with plug blades having predetermined dimensional characteristics and not move the shutter mechanism otherwise.

In another aspect, the present invention is directed to an electrical wiring device includes a receptacle member having a housing and a cover. The cover assembly includes receptacle openings configured to accommodate plug blades. A plurality of receptacle contacts are disposed in the housing. Each of the plurality of receptacle contacts is coupled to a respective line terminal. Each of the plurality of receptacle contacts is in communication with a corresponding receptacle opening. A protective shutter mechanism is disposed within the receptacle member. The protective shutter mechanism includes a shutter including an opening corresponding to the hot contact and further including a blade detection geometry. The blade detection geometry includes two spaced apart flexible members disposed at a first end of the shutter. The two spaced apart flexible members are disposed proximate to the neutral contact. The shutter is movable from a closed position to an open position upon the insertion of the plug contact blades. The shutter is not moveable from the closed position unless a plug contact blade simultaneously engages the two spaced apart flexible members. A biasing member is disposed to position the shutter in the closed position absent the presence of an inserted plug contact blade.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 6B is a perspective view of an alternative embodiment of the shutter mechanism of FIG. 5;

FIG. 6C is an enlarged fragmentary view of an alternative embodiment of the shutter mechanism;

FIG. 7A is a perspective view of a locking shutter embodiment in accordance with an embodiment of the present invention;

FIG. 7B is a front elevation view of a plurality of different standard receptacle configurations;

FIG. 7C is side elevation view of a plurality of different commonly used plug contact blade pairs;

FIG. 7D is a perspective view of an alternative embodiment of the locking shutter of FIG. 7A;

FIG. 7E is an fragmentary side elevation view of the locking shutter of FIG. 7D with a plug contact blade engaged in a first position;

FIG. 7F is an fragmentary side elevation view of the locking shutter of FIG. 7D with a plug contact blade engaged in a second position;

DETAILED DESCRIPTION

Figure 1:
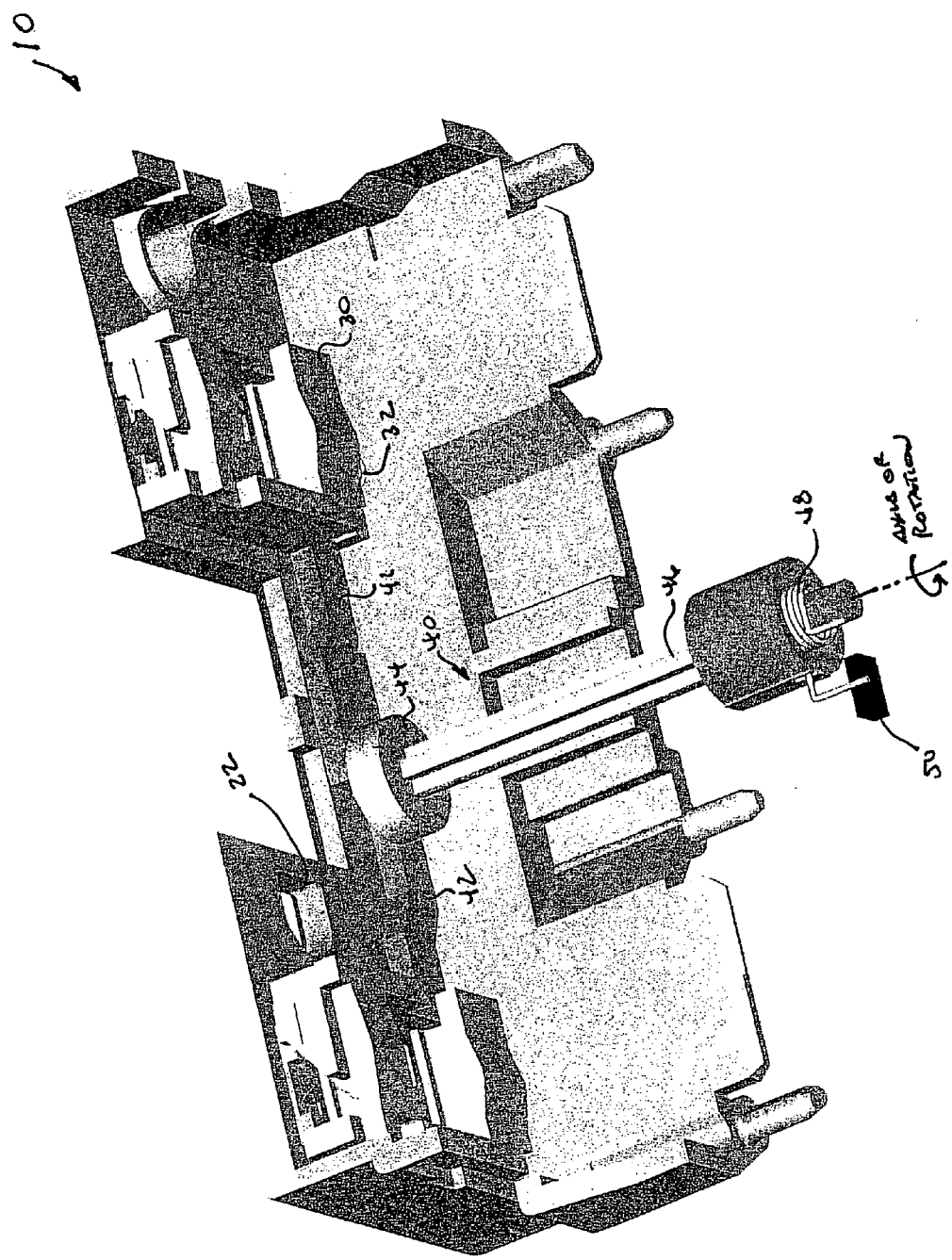
FIG. 1 is a perspective view of the shuttered receptacle in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the shuttered protective device of the present invention is shown in FIG. 1, and is designated generally throughout by reference numeral 10.

In accordance with the invention, the present invention is directed to a protection device that includes line terminals coupled to a power source disposed in an electric power distribution system. The protection device is configured to protect a portion of the power distribution system from at least one fault condition. The device includes a receptacle member that includes a housing and a cover. The cover includes receptacle openings configured to accommodate plug contact blades. Receptacle contacts are disposed in the housing. The receptacle contacts are also coupled to the line terminals to thereby establish an electrical connection between the receptacle contacts and the line terminals. Each receptacle contact is in communication with a corresponding receptacle opening. A protective shutter mechanism is integrated into the housing. The protective shutter mechanism is movable from a closed position to an open position upon insertion of the plug contact blades. The protective shutter mechanism is substantially hermetically sealed in the closed position. The protective shutter mechanism is also not movable from the closed position to the open position upon insertion of an object into only one receptacle opening, such that the object is prevented from making contact with the corresponding receptacle contact.

Thus, the present invention provides a protective mechanism whereby electrocution by inserting a single blade into a receptacle opening is prevented. The protective mechanism is sealed in the closed position such that water, corrosive compounds, particulate matter, insects, and other contaminants are not introduced into the device via the receptacle openings. The present invention also provides a means for detecting a miswire condition that may be employed in conjunction with the protective shutter mechanism to thereby prevent the insertion of a plug into the receptacle until such time as power has been properly connected to the line terminals of the protection device.

As embodied herein, and depicted in FIG. 1, a perspective view of the protection device 10 in accordance with the present invention is disclosed. Device 10 includes linkage assembly 40 disposed within receptacle 20. Receptacle 20 is of a type commonly employed in the art. As such, the receptacle contacts, the feed through terminals, and the line terminals are not shown for clarity of illustration. Referring back to FIG. 1, linkage assembly 40 is mechanically coupled to protective shutter mechanism 30. Thus, protective shutter mechanism is integrated within the housing (not shown). Before device 10 is wired correctly, each protective shutter 30 is disposed in a locked position, such that plug blades or other objects cannot make contact with the receptacle contacts. Mis-wiring sensor 50 is coupled both to the line terminals and linkage assembly 40. Mis-wiring sensor 50 senses when device 10 has been properly wired. When the device has been properly wired, sensor 50 actuates linkage assembly 40 causing the protective shutter mechanism 30 to move from the locked position to the unlocked position. In the unlocked position, the plug blades are permitted to make contact with the receptacle contacts upon insertion of the plug blades into the receptacle openings. However, as will be explained in detail below, shutter mechanism 30 prevents objects that are inserted into individual openings 22 from making contact with the receptacle contacts.

Figure 2:
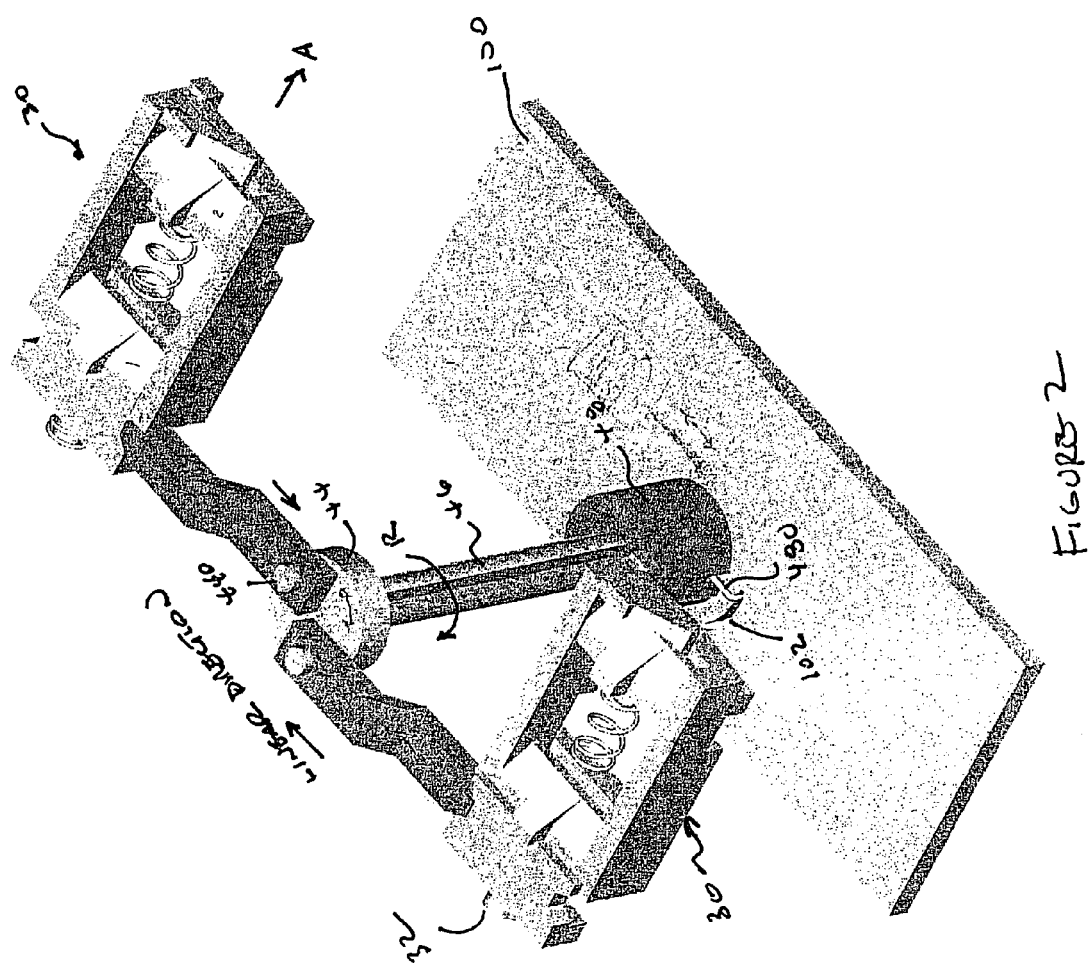
FIG. 2 is a detailed view of the linkage assembly shown in FIG. 1.

Referring to FIG. 2, a detailed view of the linkage assembly 40 shown in FIG. 1 is disclosed. Linkage assembly 40 includes two pivot arms 42, each of which are removably coupled to a protective shutter 30 in the closed position. Cam member 44 is coupled to pivot arms 42, by way of pivots 440. The cam member is configured to rotate around an axis of rotation to thereby move the pivot arms 42 in the linear direction as shown. Rotor 46 is coupled to cam 44 at one end, and is also coupled to circuit board 100 at an opposite end. A torsion spring assembly 48 is coupled to rotor 46. Spring assembly 48 includes torsion spring 480 which is coupled to mis-wiring sensor 50, which is disposed on the other side of board 100, and is therefore, not shown in this view. In the closed position, torsion spring 480 is in tension, and stores mechanical energy. When sensor 50 sensor senses the proper wiring condition, it releases spring 480, allowing it to move within slot 102. The stored mechanical energy is released, causing rotor 48 to rotate cam 46 about the axis of rotation. In response, each pivot arm 42 is moved in a linear direction as shown.

In the locked position, spring 32 is disposed between the interior of receptacle body 20 and an edge of protective shutter 30. In this position, spring 32 is in tension. When pivot arms 42 are moved, each pivot arm 42 detaches from shutter 30. The energy stored in spring 32 is released and each spring member 32 pushes protective shutter 30 into the unlocked position. After shutter mechanism 30 is moved in direction "A," as shown, mechanism 30 is closely aligned with receptacle contacts 22.

Figure 3:
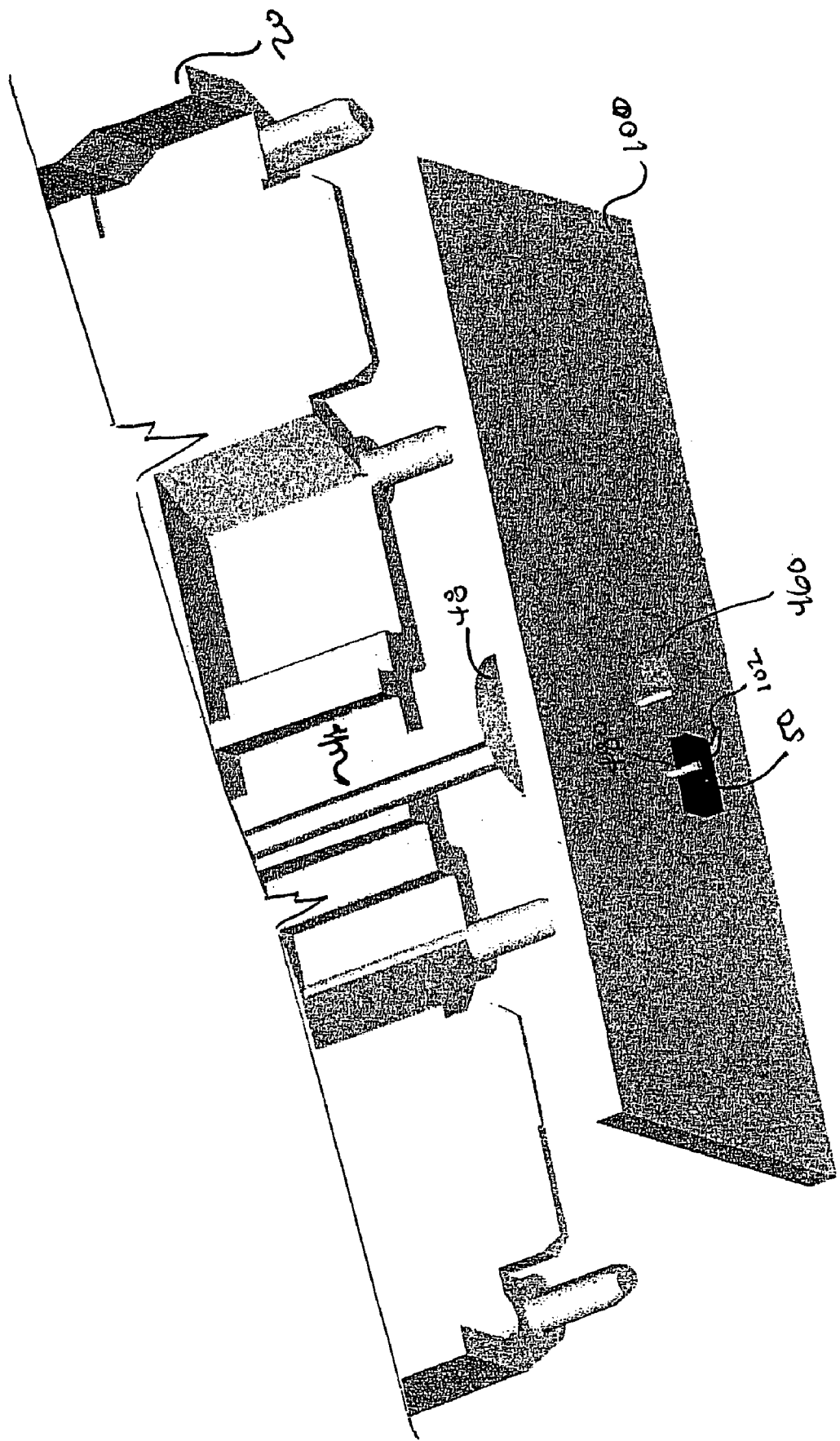
FIG. 3 is a detail view showing the interconnection of linkage assembly 40 and circuit board 100.

Referring to FIG. 3, a detail view showing the interconnection of linkage assembly 40 and circuit board 100 is shown. Rotor 46 includes a cylindrical portion 460 which is configured to be inserted into a round hole disposed in circuit board 100. Miswire sensor 50 is soldered to the underside of circuit board 100. In this embodiment, sensor 50 is implemented as a resistor. When device 10 is properly wired, current begins to flow through resistor 50 causing the resistor to over-heat. In one embodiment, the solder that connects resistor 50 to the board gives way, and spring portion 480 is allowed to move within slot 102. In another embodiment, the resistor 50 burns away, and spring 480 is allowed to move within slot 102. When this happens, the circuit that incorporates resistor 50 is open. This will be explained in more detail in the discussion pertaining to FIG. 8 and FIG. 9.

Figure 4:
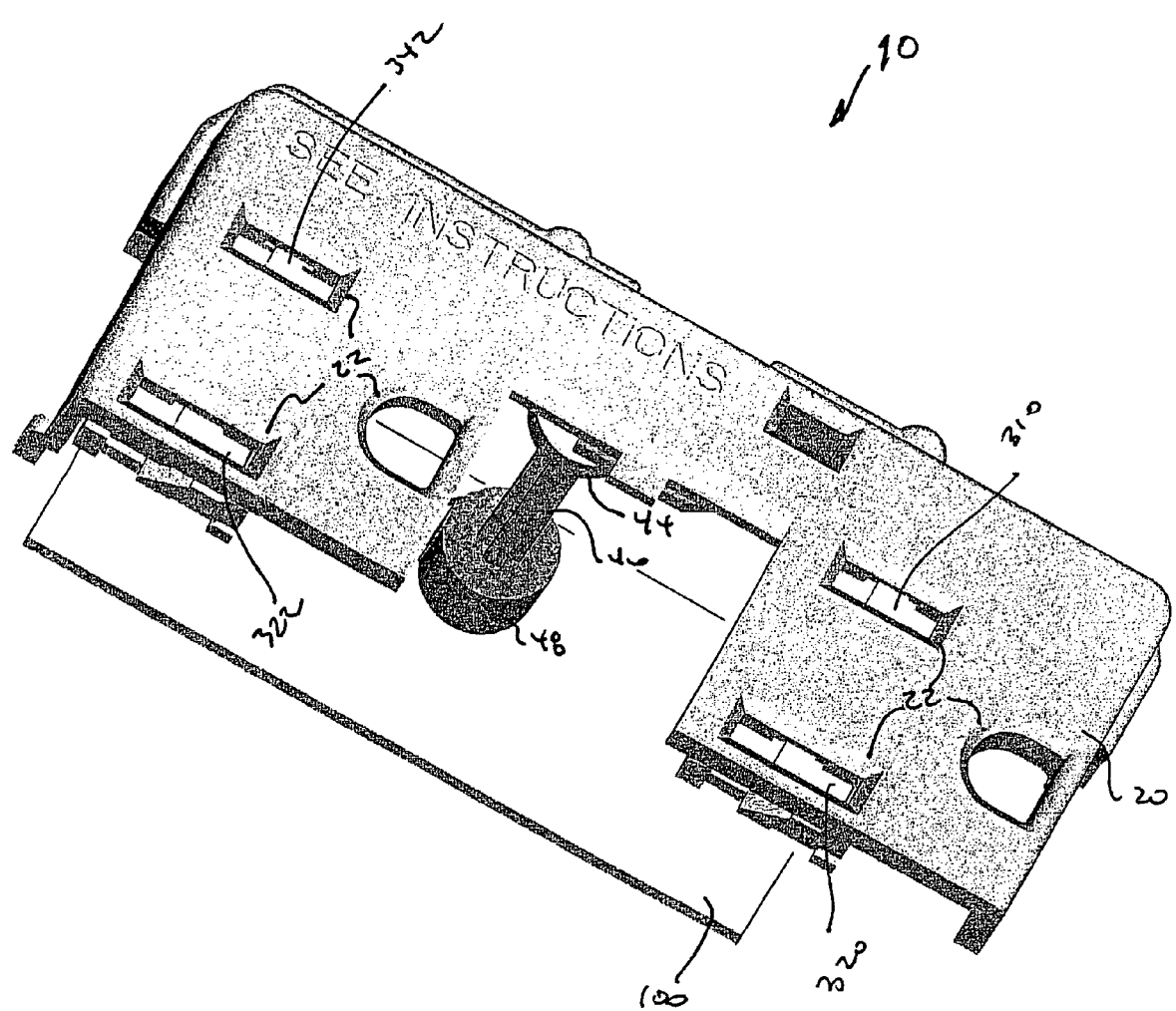
FIG. 4 is a front view of the receptacle body shown in FIG. 1.

Referring to FIG. 4, a front view of the receptacle body 20 is shown in the unlocked position. In this view, it is important to note that neutral shutter member 310 and hot shutter member 320 block receptacle openings 22, preventing plug blades from making contact with the corresponding receptacle contact disposed within receptacle body 20.

Figure 5:
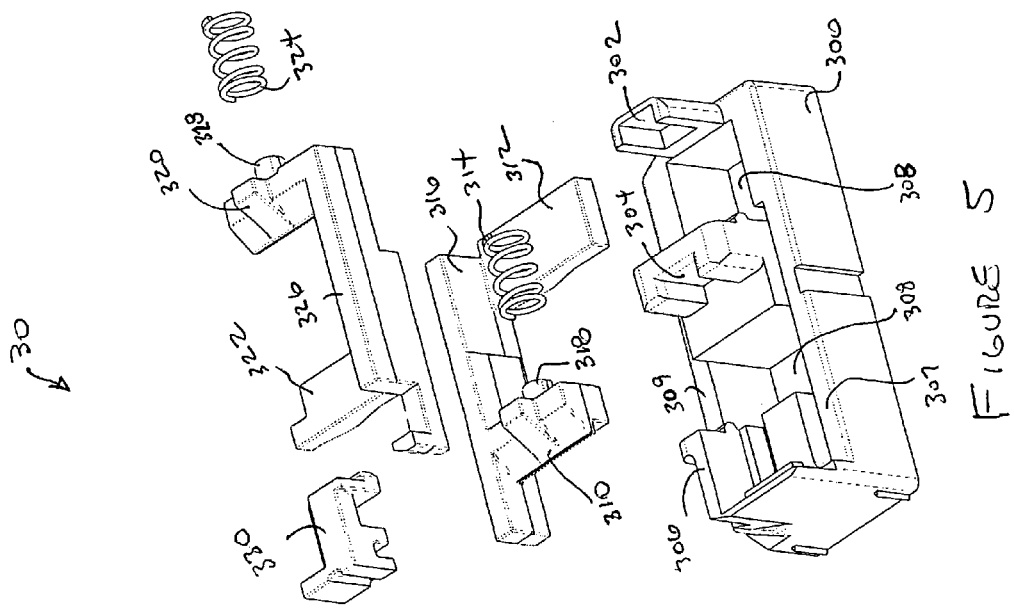
FIG. 5 is an exploded view of the protective shutter mechanism.

As embodied herein and depicted in FIG. 5, an exploded view of a protective shutter mechanism 30 in accordance with an embodiment of the present invention is disclosed. Shutter mechanism 30 includes a shutter housing 300 that is configured to accommodate neutral shutter member 310, hot shutter member 320, and in a 20A embodiment, T-slot shutter 330. Thus, mechanism 30 accommodates both 15A service and 20A service.

Shutter housing 300 includes pocket 302 and pocket 304 configured to accommodate spring 324 and spring 314, respectively. Shutter housing 300 also includes neutral shutter stop member 306. Shutter housing 300 also includes openings 308 which provide plug blades access to the electrical terminals coupled to the electrical circuit. Housing 300 includes slide surface 307 and slide surface 309 which accommodate slide arm 326 and slide arm 316, respectively. It will be apparent to those of ordinary skill in the pertinent art that modifications and variations can be made to shutter housing 300 of the present invention depending on the material selected. For example, shutter housing 300 may be fabricated using any suitable material such as a molded plastic.

Shutter mechanism 30 includes neutral shutter member 310 which is configured to be inserted into housing 300. Neutral shutter 310 is configured to slide within housing 300 when plug blades are inserted into openings 22 (See FIG. 1 and FIG. 4). Neutral shutter 310 includes a blocking member 312 which prevents a single object from accessing the hot terminal contact via an opening 22. Of course, when plug blades are inserted, the neutral shutter 310 and the hot shutter 320 move simultaneously. Blocking member 312 to moves away from its respective opening 308. Neutral shutter 310 includes nipple member 318 which is configured to accommodate spring 314. As noted above, spring 314 fits into pocket 304. Thus, spring 314 is configured to urge neutral shutter 310 against stop member 306 to thereby close its respective opening 308. Finally, neutral shutter 310 includes slide arm 316 which is configured to slide along surface 309 of housing 300, when plug blades are inserted into openings 22.

Hot shutter member 320 interlocks with neutral shutter member 310. The combination of shutter 310 and shutter 320 are configured to be inserted into housing 300. Hot shutter 320 and neutral shutter 310 are configured to slide within housing 300 when plug blades are inserted into openings 22 (See FIG. 1 and FIG. 4). Hot shutter 320 includes a blocking member 322 which prevents a single object from accessing the neutral terminal contact via an opening 22. Of course, when a plug blades are inserted, the hot shutter 320 and the neutral shutter 310 move simultaneously, causing blocking member 312, 322 to move away from its respective opening 308. Hot shutter 320 includes nipple member 328 which is configured to accommodate spring 324. As noted above, spring 324 fits into pocket 302. Thus, spring 324 is configured to urge hot shutter 320 against an opposing side of pocket member 304 to thereby close its respective opening 308. Finally, hot shutter 320 includes slide arm 326 which is configured to slide along surface 307 of housing 300, when plug blades are inserted into openings 22.

Figure 6:
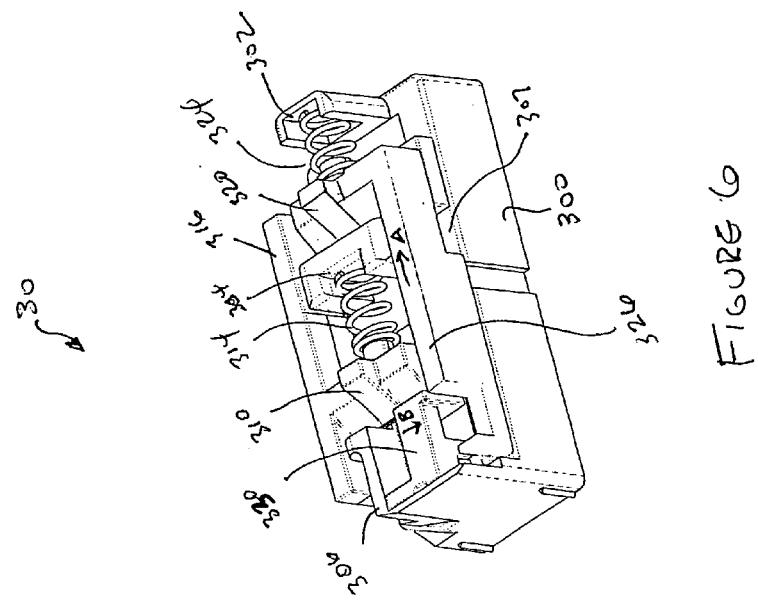
FIG. 6 is a view of the assembled protective shutter mechanism.

Referring to FIG. 6, a view of the assembled protective shutter mechanism is shown. FIG. 6 is self-explanatory, showing the interlocking relationship of shutter 310 and shutter 320. In operation, shutter member 310 and shutter member 320 move in direction A, as shown in FIG. 6. In the 15A embodiment, shutter 330 is not used because opening 22 does not include a T-slot. In this embodiment, shutter 330 is not moveable and may be integral with element 306. In the 20A embodiment, shutter 330 is configured to move in direction B once slide arm 326 moves in direction A.

The shutter blade assembly described in FIG. 5 and FIG. 6 may be employed in conjunction with the miswire detection apparatus described in FIGS. 1–3. Insertion of a connector plug to make electrical connection with the receptacle contacts is thereby prevented until such time as power has been properly connected to the line terminals of the protection device.

The shutter blades have been described with respect to a connector plug having two blades. The shutter blades prevent the risk of an electric shock when an object is inserted into one receptacle opening. Also, the shutter blades can be substantially hermetically sealed to prevent the entrance of contaminants.

In another embodiment of the present invention, shutter mechanism 30 is further configured to prevent the entrance of contaminants. Two receptacle openings are protected as previously described. A third receptacle opening may be included to receive a ground blade of a grounded connector plug. A second protective shutter mechanism is included that moves from the closed position for preventing ingress of contaminants, to the open position when the ground blade is inserted. The second protective shutter mechanism operates independently from the first shutter mechanism. This allows insertion of connector plugs that are not equipped with a ground blade, and the insertion of connector plugs whose ground blades are configured to be longer than the other blades. The second shutter mechanism is similar to shutter mechanism 30, with the exception that one of the slide assemblies is omitted.

In another embodiment of the present invention, the shutter blades can be configured to prevent the entrance of contaminants. Single slide assemblies are disposed in the receptacle housing to correspond with each receptacle opening. When an object, preferably the blade of a connector plug is inserted into a receptacle opening, the corresponding slide assembly urges the blade shutter to move from the closed to the open position. This allows the plug blade to insert further to make electrical connection with the corresponding receptacle contact. The single slide assemblies are configured to move independently from one another.

Figure 6A:
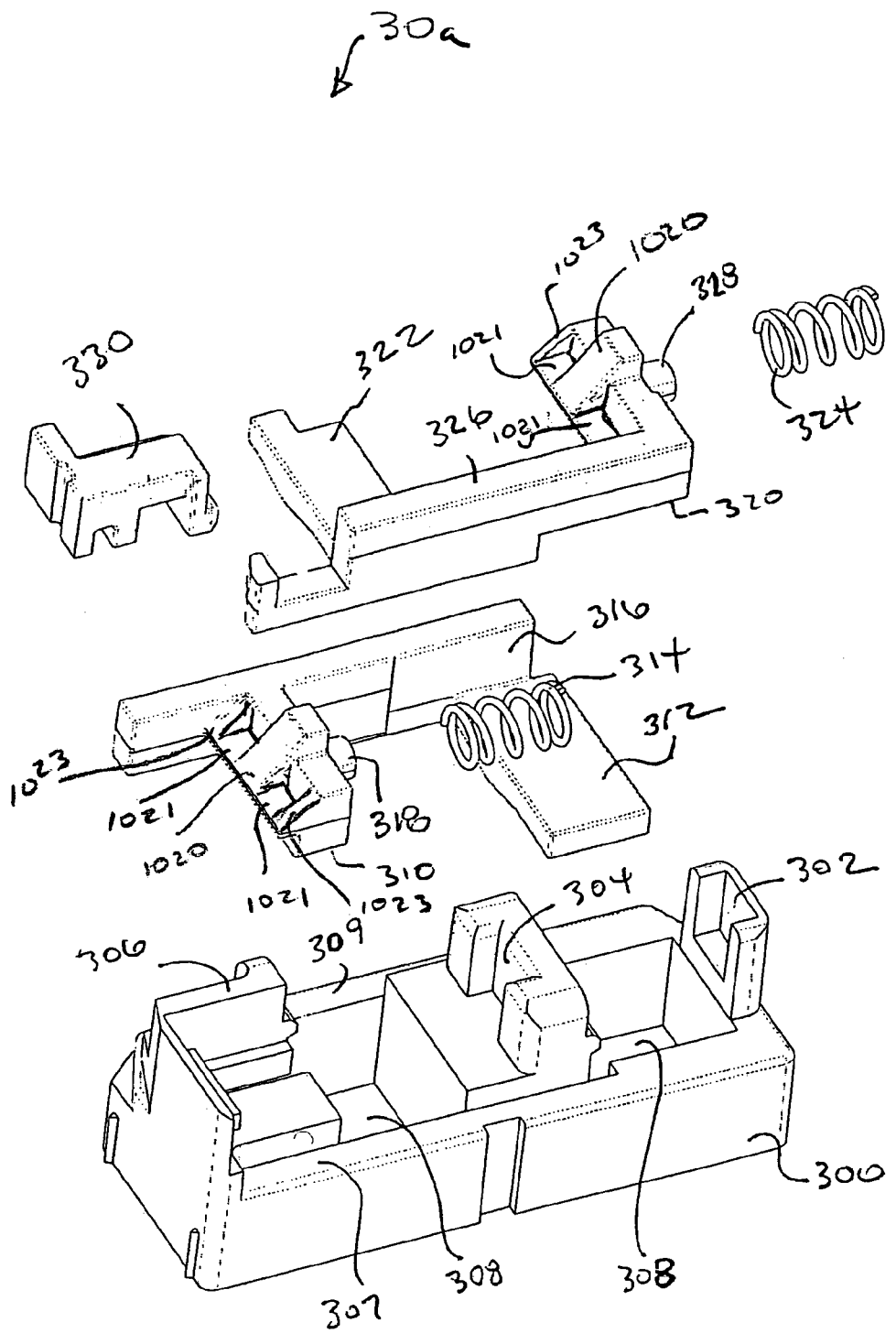
FIG. 6A is an enlarged fragmentary view of an alternative embodiment of the shutter mechanism of FIG. 5.

In another embodiment of the present invention shown in FIG. 6A, the protective shutter mechanism 30a is configured to make it more difficult for foreign objects (dual objects) to defeat the shutter system. Either neutral shutter member 310, hot shutter member 320, or both include a blade detection geometry, the blade detection geometry includes a narrow ramp 1020 on a planar surface 1021. Preferably, the narrow ramp 1020 is centrally located in planar surface 1021. The narrowness of the ramp 1020 makes it difficult to use a small foreign object to open the shutter mechanism 30a. Examples of a small foreign object are the rounded contour portion of a paper clip, the wire end of an unfolded paper clip, or a bobby pin. In this embodiment, it is likely that a small object bearing down on the ramp 1020 will slip off of the ramp 1020 and onto planar surface 1021. An object bearing down on planar surface 1021 cannot exert force in the vectored direction required to open shutter mechanism 30a. The ramp 1020 may also be configured with a rounded or chamfered surface to increase the likelihood that the small object will slip off. Conversely, if a plug blade is inserted, it is desirable that the shutter mechanism 30a open. The dimensions of the receptacle opening, such as openings corresponding to receptacle contacts 22 in FIG. 4, constrains the plug blade, preventing the blade from slipping off of narrow ramp 1020. An object bearing down on narrow ramp 1020 succeeds at exerting force in the vectored direction required to open shutter mechanism 30a.

Shutter mechanism 30a accommodate 15A service, 20-A service, or both. Shutter mechanism 30a includes a shutter housing 300 that is configured to accommodate neutral shutter member 310, hot shutter member 320, and in a 20A embodiment, T-slot shutter 330.

Shutter housing 300 includes pocket 302 and pocket 304 configured to accommodate spring 324 and spring 314, respectively. Shutter housing 300 also includes neutral shutter stop member 306. Shutter housing 300 also includes openings 308 which provide plug blades access to the electrical terminals coupled to the electrical circuit. Housing 300 includes slide surface 307 and slide surface 309 which accommodate slide arm 326 and slide arm 316, respectively. It will be apparent to those of ordinary skill in the pertinent art that modifications and variations can be made to shutter housing 300 of the present invention depending on the material selected. For example, shutter housing 300 may be fabricated using any suitable material such as a molded plastic.

Shutter mechanism 30a includes neutral shutter member 310 which is configured to be inserted into housing 300. Neutral shutter 310 is configured to slide within housing 300 when plug blades are inserted into openings 22 (See FIG. 1 and FIG. 4). Neutral shutter 310 includes a blocking member 312 which prevents a single object from accessing the hot terminal contact via an opening 22. Of course, when plug blades are inserted, the neutral shutter 310 and the hot shutter 320 move simultaneously. Blocking member 312 is configured to move away from its corresponding opening 308. Neutral shutter 310 includes nipple member 318 which is configured to accommodate spring 314. As noted above, spring 314 fits into pocket 304. Thus, spring 314 is configured to urge neutral shutter 310 against stop member 306 to thereby close its respective opening 308. Finally, neutral shutter 310 includes slide arm 316 which is configured to slide along surface 309 of housing 300, when plug blades are inserted into openings 22. The neutral shutter 310 is configured with a 1 ramp member 1020 located on planar surface 1021. Additional ramp members 1023 can be disposed at the outer edges of the planar surface 1021. Additional ramps 1023 are configured similar to ramp 1020 such that a small object bearing on a ramp 1023 slides into planar surface 1021, whereupon the small object cannot open the shutter. The additional ramp(s) are positioned so that a plug blade can bear down on them at the same time which facilitates the opening of the shutter.

Hot shutter member 320 interlocks with neutral shutter member 310. The combination of shutter 310 and shutter 320 are configured to be inserted into housing 300. Hot shutter 320 and neutral shutter 310 are configured to slide within housing 300 when plug blades are inserted into openings 22 (See FIG. 1 and FIG. 4). Hot shutter 320 includes a blocking member 322 which prevents a single object from accessing the neutral terminal contact via an opening 22. The hot shutter 312 is configured with a ramp member 1020 located on planar surface 1021. Two additional ramp members 1023 can be disposed at the outer edges of the planar surface 1021. Additional ramps 1023 are configured similar to ramp 1020 such that a small object bearing on a ramp 1023 slides into planar surface 1021, whereupon the small object cannot open the shutter. The additional ramp(s) are positioned so that a plug blade can bear down on them at the same time which facilitates the opening of the shutter. Of course, when plug blades are inserted, the hot shutter 320 and the neutral shutter 310 move simultaneously, causing blocking member 322 to move away from its respective opening 308. Hot shutter 320 includes nipple member 328 which is configured to accommodate spring 324. As noted above, spring 324 fits into pocket 302. Thus, spring 324 is configured to urge hot shutter 320 against an opposing side of pocket member 304 to thereby close its respective opening 308. Finally, hot shutter 320 includes a slide arm 326 which is configured to slide along surface 307 of housing 300, when plug blades are inserted into openings 22.

FIG. 6B shows a detailed view of hot shutter member 320, which could equally have been shown as neutral shutter member 310. Member 320 also includes a blade detection geometry. For example, contoured surface 1018 on ramp 1020 increases the likelihood of a small foreign object sliding into planar surface 1021. The cross section of contoured surface 1018 can be ramped, pointed, arcuate, or the like.

Turning to FIG. 6C, there is shown an enlarged fragmentary view of an alternative embodiment of the neutral shutter 310. Both the neutral and hot shutters include blade detection geometries. The neutral shutter 310 includes a ramp 1020 having contoured surface 1020a similar to contoured surface 1018. The ramp 1020 is disposed between two planar surfaces 1021. The planar surfaces 1021 are oriented so as to reduce the likelihood that a foreign object can be used to move the neutral shutter 310 out of the way thereby allowing access to the receptacle contacts (not shown). The neutral shutter 310 further includes two ramp members 1023 disposed at the ends of the recessed planar surfaces 1021. The two ramp members 1023 each include contoured surfaces 1023a. The contoured surfaces 1023a, and 1020a are configured to engage a plug contact blade inserted into the receptacle opening. As the plug contact blade is inserted into the receptacle opening, the end of the plug blade runs on the contoured surfaces 1020a, 1023a moving the neutral shutter 310 out of the way, thereby allowing the plug blade to engage a receptacle contact. The neutral shutter 310 can include an inclined surface 1023b that forms a border around the periphery of the neutral shutter 310. The inclined surface 1023b is substantially coplanar with a plane tangent to all three contoured surfaces 1020a, 1023a. The use of the inclined plane 1023b in neutral shutter 310 enhances the utility of the multiple ramp configuration by increasing the number of plug blade geometries that can open the neutral shutter, thereby providing compatibility with the large number of existing plug blade configurations in use.

It should be understood that although the foregoing discussion of the details of the embodiment shown in FIG. 6C was with reference to a neutral shutter 310, the same principles and design elements are equally applicable to a hot shutter 320 and that the hot shutter 320 of the present invention may be readily modified to a substantially similar configuration.

Figure 7:
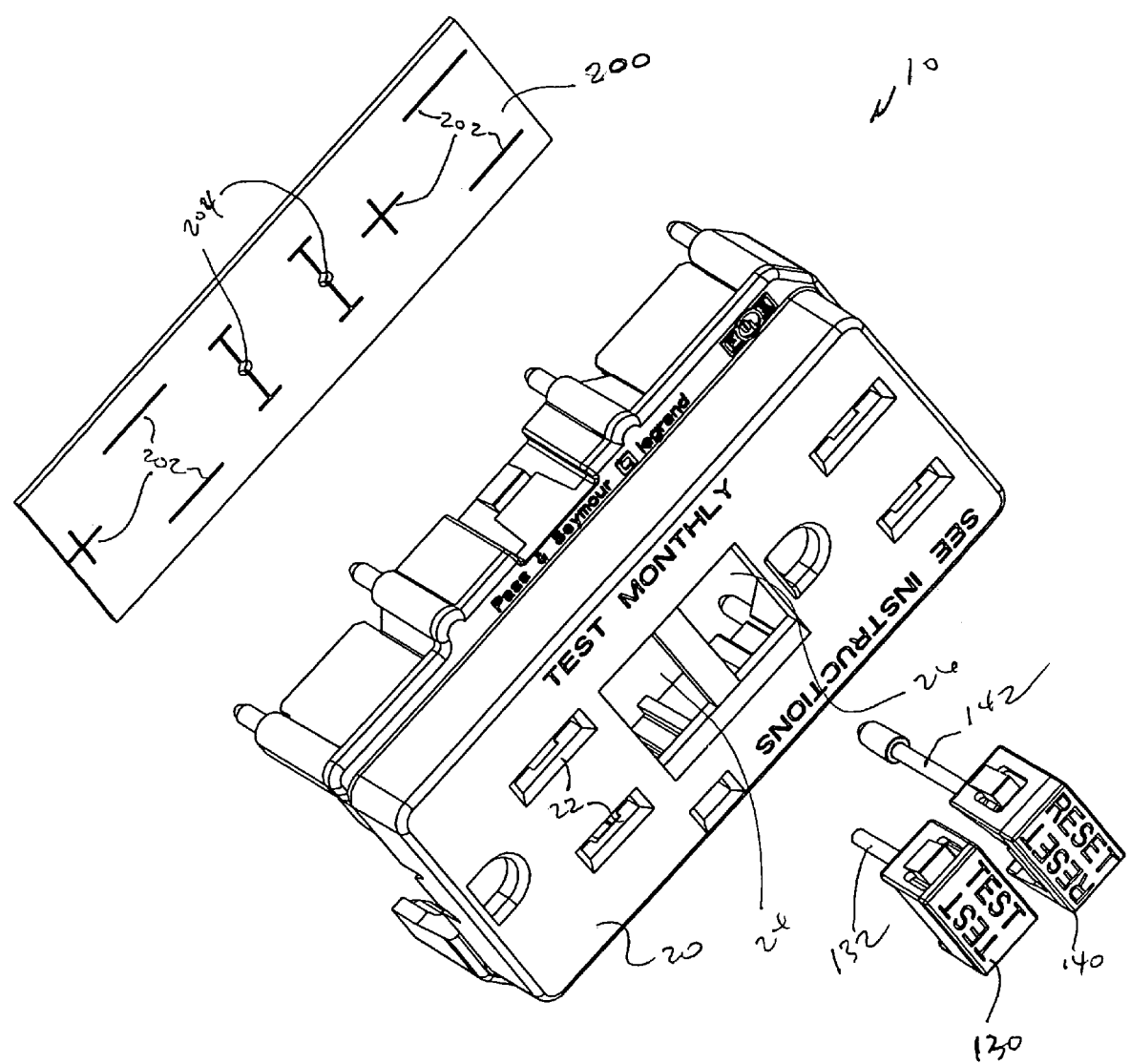
FIG. 7 is an exploded view showing the protective membrane.

As embodied herein and depicted in FIG. 7, the receptacle openings of the protective device are protected with a flexible membrane 200 to keep out contaminants. The flexible membrane 100 has sealable holes 202 corresponding to the receptacle openings 22. When sealable holes 202 are closed, body 20 is substantially sealed and contaminants are substantially prevented from entering. When a plug blade or some other object is inserted into the receptacle opening 22, sealable hole 202 is configured to flex from a closed position into an open position, to thereby permit further insertion of the blade until an electrical connection with the corresponding receptacle contact is made. Flexible membrane 200 may be configured to protect all receptacle openings, or may be configured to protect openings that are otherwise unprotected by the blade shutters, with or without miswire protection.

As embodied herein and depicted in FIG. 7A, the receptacle openings of the protective device may be protected by a locking shutter 1000. The locking shutter 1000 is a slideable member disposed within the protective device. The locking shutter 1000 includes an opening 1002 that is sized to allow a plug blade to pass through. The locking shutter 1000 further includes a blade detection geometry that includes two flexible members 1004, 1006 disposed at a common end of the locking shutter 1000. The two flexible members 1004, 1006 are separated by a slot 1012. The slot 1012 allows the two flexible members 1004, 1006 to move independent of one another. The slot is either narrow or configured to prevent the smallest expected object to pass there through. Each of the two flexible members 1004, 1006 includes a ramp member 1008 and a locking member 1010. The ramp 1008 is configured to engage a plug contact blade, when the plug contact blade is inserted into the receptacle. The ramps 1008 are spaced apart from one another such that only an object that is geometrically similar to a plug blade can contact both of the ramps 1008.

When a shutter is configured to be opened when a hot plug blade is inserted, the distance between the inside edges of ramps 1008 is preferably about 0.200 to about 0.220 inches, and the distance between their outside edges is preferably about 0.280 to about 0.300 inches. When a shutter is configured to be opened when a neutral plug blade is inserted, the distance between the inside edges of ramps 1008 is preferably about 0.200 to about 0.220 inches and the distance between the outside edges of the ramps 1008 is from about 0.340 to about 0.360 inches.

The ramps 1008 include a sloped surface 1022. The sloped surface 1022 is angled such that force of a plug contact blade being inserted into the receptacle opening is translated into a lateral movement of the locking shutter 1000.

The locking members 1010 of the two flexible members 1004, 1006 are configured to prevent the opening of the looking shutter 1000 if something other than a plug blade is inserted into one of the openings of the receptacle. The locking members 1010 shown in FIG. 7A are wedge shaped protrusions which engage complementary structures (not shown) in the interior of the protective device. In operation, a plug blade contacts the sloped surfaces 1022 of both ramps 1008. The plug blade is inserted deeper into the receptacle, the flexible members (1004, 1006) deflect, causing the locking members 1010 to disengage from their complementary structures (not shown). The sloped surfaces 1022 may be inclined with respect to the sides of the ramps 1008. When the locking members 1010 have been disengaged from their complementary structures (not shown) the locking shutter 1000 moves laterally in the direction shown by the arrow 1015 until the opening 1002 is aligned with one receptacle contact position 1019. Simultaneously the edge 1016 of the locking shutter 1000 moves until the plug blade comes to the end of the slope 1022 and is able to pass by the end 1016 of the locking shutter 1000 and engage the corresponding receptacle contact position 1013.

The locking shutter 1000 is normally maintained in a closed position by a biasing member 1014, thereby preventing objects from entering the receptacle. As shown in FIG. 7A, the biasing member 1014 is a spring and more specifically a coil spring. It will be appreciated, however, that other types of biasing members or springs, such as, for example torsion or leaf springs or the equivalent may be used as a biasing member as well.

The inside edges of the ramps 1008 are separated by a predetermined distance. The width of the plug blade is greater than the predetermined distance, enabling the plug blade to bear down on both ramps 1008, causing flexible members (1004,1006) to both deflect, releasing both locks 1010 as a precondition for the shutter moving to an open position. If a small foreign object (dual object) is inserted, having a width less than the expected plug blade width, the object may run on only one ramp, in which case the other lock 1010 is not released. A locked shutter 1010 prevents the object from opening the shutter.

Furthermore, the distance between the outside edges of the ramps 1008 can be chosen to be the maximum expected width of the plug blade, and locks 1010 can be configured to flank the outside edges of ramps 1008. Thus if a plug blade is inserted, the shutter opens as has been previously described. However, if a large foreign object is inserted, whose width is greater than the expected width of the plug blade, e.g. a wide screwdriver blade, the object slides down ramps 1022 as the object is inserted. The shutter starts to move in the direction of arrow 1015. However, when the object reaches lock 1010, the lock itself obstructs further movement of the object down ramps 1008. Thus, the shutter is moved to an extent but locks 1010 prevent the shutter from moving to the open position. While a foreign object could be used to open the locking shutter 1000, the instant embodiment makes opening the locking shutter using anything other than a plug contact blade or a similarly sized and shaped item difficult.

Referring to FIG. 7B, a representative sampling of standard receptacle opening configurations is shown. FIG. 7C shows a sampling of plug blade configurations. The plug housing secures a plurality of plug blades in spaced relationship to mate with one or more receptacle opening configuration.

It will be appreciated by those skilled in the art that plug blades come in a variety of configurations. Examples of some of the available configurations are shown in FIG. 7C. As can be seen from FIG. 7C, plug contact blades are typically elongate members. The plug blade for engagement with the hot receptacle contact is typically on the order of about 0.240 inch to 0.260 inch wide. The plug contact blade for engagement with the neutral polarity generally come in two widths from about 0.240 inch to about 0.260 inch in one embodiment and from about 0.307 inch to about 0.322 inch in a second embodiment. The end of the plug blade can have many form factors, for example, as shown in FIG. 7C. The plug blade may have a semi circular end, a substantially rectangular end, a substantially rectangular end with rounded corners, a substantially rectangular end with chamfered corners or a substantially rectangular end with notched, or radial relieved corners. Similar form factors are used for the ends of plug blades intended for engagement with the neutral receptacle contact. Ramps 1008 can be configured to engage hot or neutral plug blades, or both. Those of ordinary skill in the art will readily understand how ramps 1008 can be appropriately configured, and how sloped surfaces 1022 can be appropriately contoured.

As embodied herein and depicted in FIG. 7D, the blade detection geometry is modified such that the ramps 1008 of the flexible members 1004, 1006 are truncated. Truncating the ramps 1008 allows the plug blade with radial relieved corners to actuate the locking shutter 1000 without bottoming out. An example of a plug contact blade 1026 with radial relieved corners 1027 engaging the ramps 1008 is shown in FIG. 7E and FIG. 7F. Returning to FIG. 7D, the ramps 1008 are truncated and the edges 1016 of the flexible members 1004, 1006 are set back from the ends 1024 of the locking members 1010.

Figure 8:
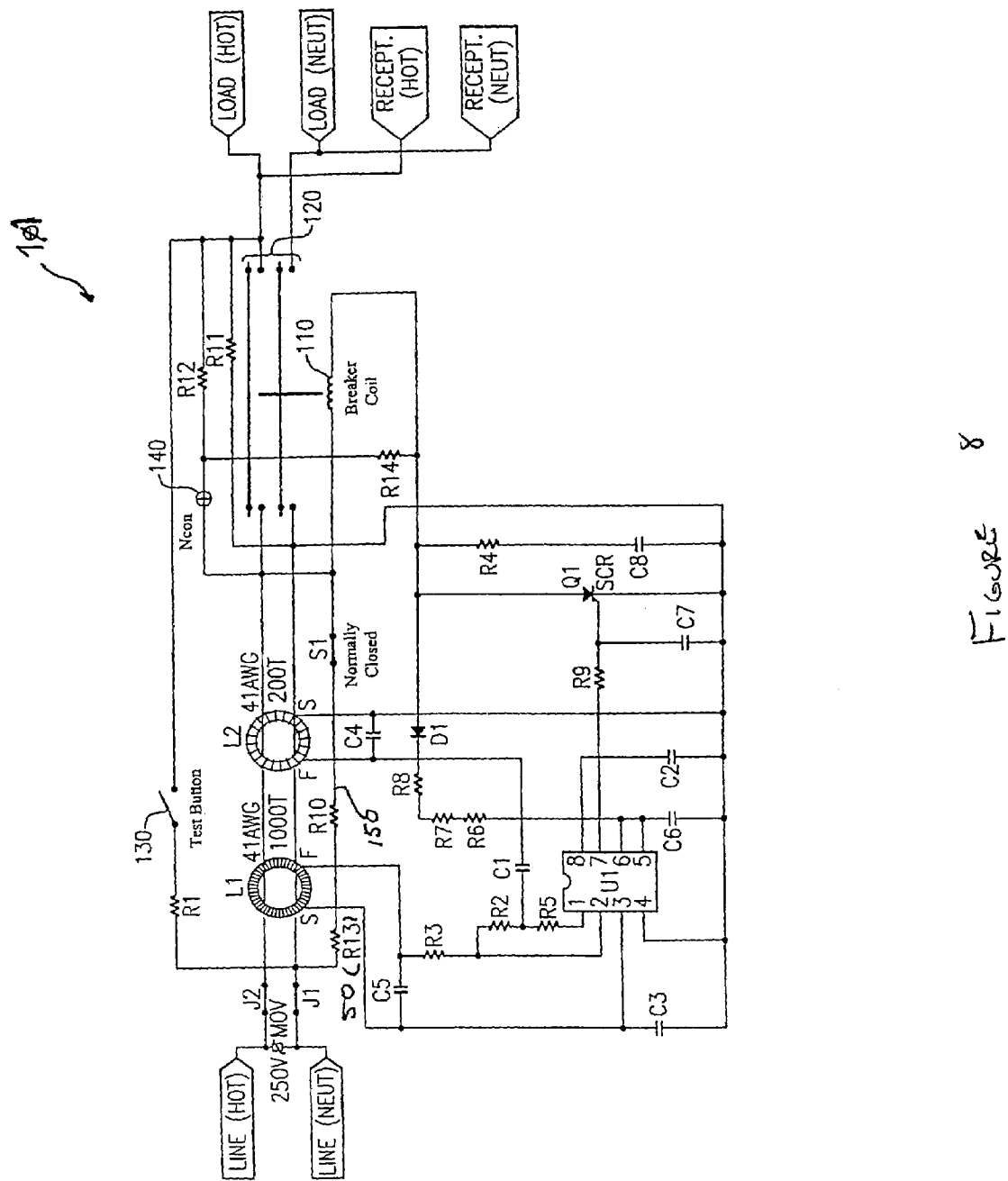
FIG. 8 is a schematic of the fault detection circuit in accordance with an embodiment of the present invention.

The embodiments as set forth in FIGS. 7 and 8 to permit shutters to open during insertion of a plug but not during insertion of a foreign object (dual object) can be combined for increased ability to reject insertion of a foreign object. For example, ramps 1008 can be contoured so that a foreign object slides off of the ramp. If the foreign object is subsequently running along only one of the ramps 1008, a lock 1010 will remain engaged and the shutter will remain closed. If the foreign object manages to slide off of both ramps and is able to contact one or both flexible members (1006,1008) the vectored direction of the force in which the object is inserted is downward, i.e., in a direction other than 1015. Thus the shutter will not open.

As will be described below, the present invention also provides a means for detecting a miswire condition. This miswire detection functionality may be employed in conjunction with protective shutter mechanism 30 to thereby prevent the insertion of a plug into the receptacle until such time as power has been properly connected to the line terminals of the protection device.

As embodied herein, and depicted in FIG. 8, a schematic of the fault detection circuit in accordance with an embodiment of the present invention is disclosed. Referring to FIG. 8, a GFCI circuit is shown generally at 101 which may be coupled to circuit board 100. When a differential transformer L1 senses unequal amounts of current flowing in the hot and neutral conductors due to a ground fault condition, circuit 101 causes a breaker coil 110 to activate, opening circuit interrupting mechanism 120. Circuit interrupting mechanism 120 conventionally includes hot and neutral bus bars that make and break contact with the hot and neutral power lines, respectively, via contacts located on both the bus bars and power lines at four contact points. A test button 130 induces a simulated ground fault when pushed in and causes breaker coil 110 to activate.

This improved GFCI contains two unique features that address the problems noted in the background section. The first is a miswire circuit 150 which uses resistor 50 (R13) as a fault resistance that creates a differential current on the primary of the differential current transformer L1. The differential current exceeds the level of differential current that the GFCI has been designed to interrupt, typically 6 milliamperes. Fault resistor R13 is on the line side of circuit interrupting mechanism 120 electrically located between the line and load terminals of the hot and neutral wire paths. The ground fault circuit sensing electronics of GFCI circuit 101 derives power from the line side terminals of the GFCI.

Should the GFCI be wired in a mode where power is supplied to the load terminals, i.e., miswired, and if the GFCI is tripped, that is, the contact points in the circuit interrupting mechanism 120 are open, nothing visible happens. If the GFCI is in the reset condition, that is, the contact points in the circuit interrupting mechanism are closed, it will immediately trip when powered. In this mode, the current flowing through the fault resistance R13, derived from the line terminal side of the device, is interrupted when the device trips. The estimated time it takes for the fault resistance R13 to burn away is greater than 50 ms. Because the trip time of the GFCI is less than or equal to 25 ms, fault resistance R13 does not have enough time to burn away. If one attempts to reset the device when in the miswired condition, the device immediately trips out again, and this continues until such time as the device is wired correctly, that is, when power is applied to the GFCI at the line terminals. This effectively results in a GFCI that will not operate, i.e., be able to be reset to provide power to the line terminals or open shutters 30 until such time as the device is properly wired. In light of the above description of FIGS. 1–7, it becomes apparent that resistor 50 has several functions.

When electrical power is connected in a correct manner to the line terminals, a differential current is created by the fault resistance R13 when power is applied to the device. If the device is reset before power is applied, the device trips as a result of this differential current. If the device is already in the tripped condition before power is applied, nothing visible happens. However, because the fault resistance is on the line side of the circuit interrupting mechanism 120, current through fault resistance R13 continues to flow, regardless of interrupting contacts 120 being open. This internal differential current, created by the fault resistance R13, heats fault resistance R13 until it burns away, typically in 50 ms. This can be accomplished by selecting a resistor or resistors whose power rating is greatly exceeded by the current, such that the resistor or resistors open. Once the device has been properly wired with power connected to the line terminals and fault resistance R13 has burned away, spring portion 480 is allowed to move within slot 102, unlocking shutters 30 and allowing the blades of a connector plug to make electrical connection to the receptacle contacts. When resistor R13 has burned away, there is no longer a fault current. The device can be reset and provide its normal protective functions to the receptacle contacts and to the feed-thru terminals.

Figure 9:
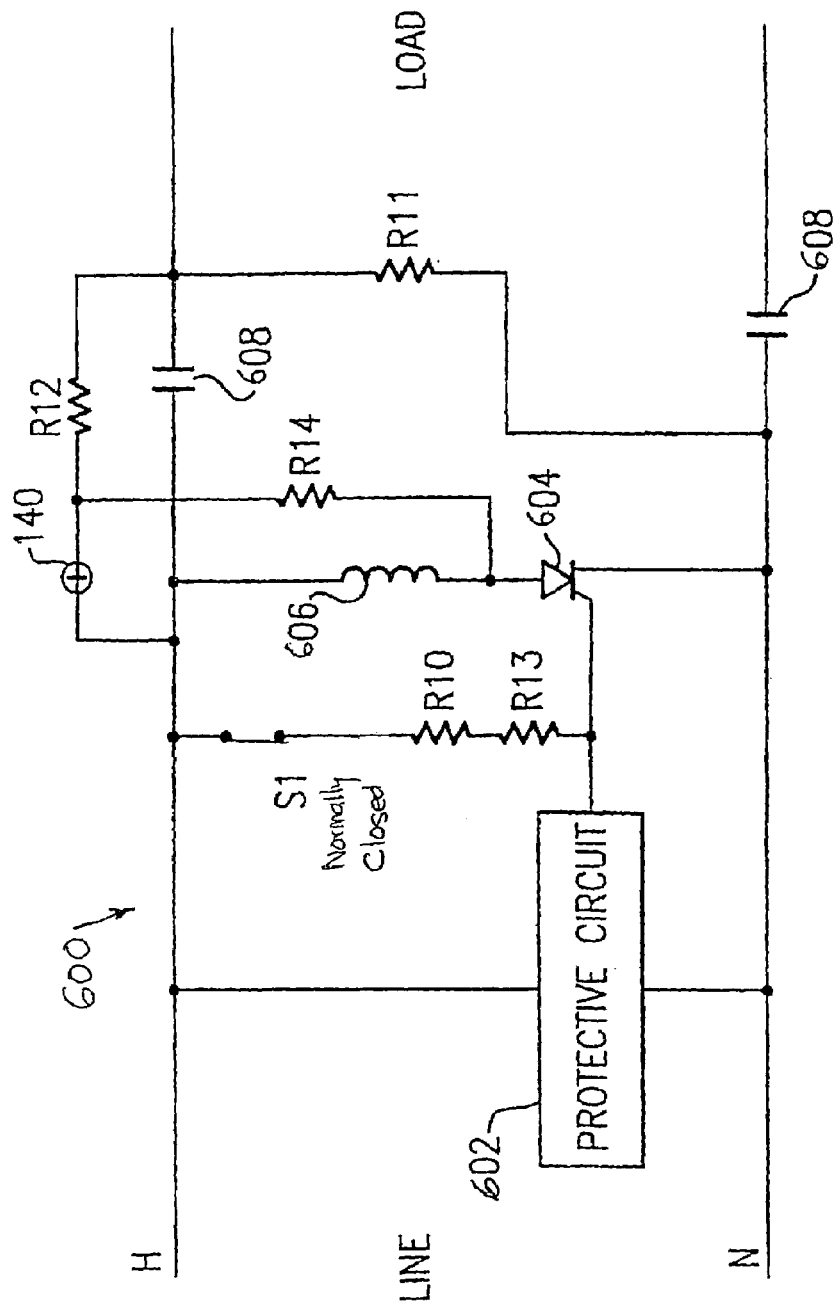
FIG. 9 is a schematic of the fault detection circuit in accordance with another embodiment of the present invention.

Referring to FIG. 9, an embodiment of the schematic is shown at 600. The embodiment is similar to the one shown in FIG. 8 except that it is generalized to apply to different protective devices such as ground fault circuit interrupters (GFCIs) or devices intended to interrupt ground faults from personnel contact with a power line conductor of the electrical distribution system, arc fault circuit interrupters (AFCIs) intended to interrupt line current which if allowed to continue could cause an electrical fire, combination devices that provide both AFCI and GFCI protection, or the like.

According to this embodiment, the protective devices mentioned have a protective circuit 600 that may be coupled to printed circuit board 100. Protective circuit 600 detects the respective fault condition, turning on an electronic switching device such as SCR 604, energizing a solenoid 606 coil which receives power from the line conductors, to open interrupting contacts 608. Fault resistance R13 has the same function as has been described above. When power is miswired to the load terminals and the protective device is reset such that interrupting contacts 608 are closed, current flows through fault resistance R13 and the gate-cathode junction of SCR 604, energizing solenoid 606 and tripping the interrupting contacts 608. Fault resistance R13 is chosen to withstand the current flow for the time that power is applied to the load terminals to the moment when interrupting contacts 608 open, approximately 25 milliseconds. If line power is connected as intended to the line terminals of the protective device, current flows through fault resistance R13 and the gate cathode junction of SCR 604 until such time as fault resistance R13 burns away, after which time it is possible to accomplish a resetting of the interrupting contacts 608. Solenoid 606 is designed not to burn out during the interval that SCR 604 is conductive, which interval is designed to be approximately 100 milliseconds. In this manner the protective functions described in FIG. 1 are provided without necessarily requiring the components typically associated with a GFCI, e.g., the differential current transformer L1 as shown in FIG. 8, or a fault resistor circuit connected to both the hot and neutral line conductors for producing a differential current. If an electronic switching device other than an SCR is used, e.g., a bipolar transistor, the connections shown here as being made to the gate of the SCR would instead be made to the base of the bipolar transistor. "Gate" and "base" are intended to have an equivalent meaning in this specification and claims.

To those skilled in the art there are number of ways of configuring miswire sensor 50 to respond to the proper wiring condition to unlock shutters 30. As has been described, fault resistance R13 is contiguous when the protective device is miswired but burns away when the protective device is properly wired. As an alternative, fault resistance R13 is contiguous when the protective device is miswired but heats sufficiently when properly wired to melt solder pads to which fault resistance R13 is connected whereupon the mechanical energy of spring 480 allows displacement of fault resistance R13. When this happens, spring 480 moves within slot 102 allowing shutters 30 to unlock, thereby allowing the blades of a connector plug to make electrical connection with the receptacle contacts.

Reference is made to U.S. Pat. No. 6,522,510, and U.S. patent application Ser. No. 09/827,007, which are incorporated herein by reference as though fully set forth in their entirety, for a more detailed explanation of the circuits employed in the protective device of the present invention.

Referring to Figure back to FIG. 7, membrane 200 may be configured to protect openings that are otherwise unprotected by the blade shutters, such as opening 24 which accommodates test button 130, and opening 26 which accommodates reset button 140. Test button 130 induces a simulated ground fault when pushed in. A similar component for producing a simulated test signal can be included in other protective devices such as arc fault circuit interrupters. The test button 130 is user accessible and has been typically located on front cover 20. Aperture 24 in front cover 20 is larger than the size of button 130 to thereby permit motion of arm 132 that activates the simulated test signal. The simulated test signal causes the circuit breaker coil 110 to activate, causing the contact points in the circuit interrupting mechanism 120 to open.

Protective device 10 may be provided with a user accessible reset button 140 to reset the contact points after the device has been successfully tested. Reset is accomplished by reset button 140 which is coupled to arm 142. Reset button 140 is disposed within a second aperture 26 in front cover 20. Again, aperture 26 must be larger than the reset button 140 to permit the actuation of button 140. Without membrane 200, contaminants may potentially enter in the spaces around button 130 and button 140. Membrane 200 is configured to provide a seal around arms 132 and 142 to thereby prevent the deleterious ingress of contaminants into the protective device. The seal is configured so as not to interfere with the motions of arms 132 and 142. Membrane 200 can be coupled to arms 132 and 142 by indents 204. In one embodiment, membrane 200 may be configured as separate sealing components.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electrical wiring device comprising:
   a receptacle member including a housing and a cover assembly, the cover assembly including receptacle openings configured to accommodate plug blades;
   a plurality of receptacle contacts disposed in the housing, a portion of which are electrically coupled to an electrical distribution system, each of the plurality of receptacle contacts being in communication with a corresponding receptacle opening; and
   a protective shutter mechanism disposed within the receptacle member between the receptacle openings and the plurality of receptacle contacts, the protective shutter mechanism including,
      at least one shutter member configured to move between a closed position and an open position, the plurality of receptacle contacts being in communication with the receptacle openings in the open position and not in communication with the receptacle openings in the closed position, and
      a blade detection geometry disposed on the at least one shutter member, the blade detection geometry being configured to engage a plug blade having predetermined dimensional characteristics and not engage objects not having the predetermined dimensional characteristics, the blade detection geometry being configured to move the shutter member to the open position when engaged with the plug blade having the predetermined dimensional characteristics and not move the at least one shutter member otherwise.

2. The device of claim 1, wherein the blade detection geometry includes a gauge that permits the shutter to open if the width of an inserted object is greater than a predetermined amount.

3. The device of claim 2, wherein the gauge comprises:
two locking members configured to lock the shutter in a closed position, the locking members configured to both move to their unlocked positions if the object is inserted whose width is greater than a predetermined amount;
two flexible members configured to hold the two locking members in the locked positions, the flexible members configured to move the locking members to the unlocked positions if the object is inserted whose width is greater than a predetermined amount, wherein the flexible members each have a ramp, the ramps separated by a distance equal to the predetermined amount.

4. The device of claim 3, wherein the ramp has a contoured surface configured such that objects having less than the predetermined width slide off of a ramp, wherein at least one of the locking member remains locked, whereby the shutter mechanism is not slidably disposed to the open position.

5. The device of claim 4, wherein the contoured surface is one of an arcuate, pointed, or ramped surface.

6. The device of claim 2, including a second gauge coupled to the shutter mechanism, wherein the shutter mechanism remains in the closed position when the object is inserted whose width is greater than a second predetermined amount.

7. The device of claim 1, wherein the shutter member includes apertures disposed to permit objects to communicate with the receptacle contacts when the shutter mechanism is in the open position.

8. The device of claim 7, wherein one receptacle contact is a neutral contact and the gauging member is proximate the neutral contact.

9. The device of claim 1, wherein the protective shutter mechanism includes a frame member disposed in the housing, the frame member including a first aperture aligned with one receptacle opening, and a second aperture aligned with another receptacle opening, and wherein the blade detection geometry includes a first slide assembly and a second slide assembly, the first slide assembly and the second slide assembly preventing objects from touching receptacle contacts when the shutter mechanism is in the closed position.

10. The device of claim 9, wherein the first and second slide assemblies are spaced apart from each other in the closed position, and configured to simultaneously slide together when the protective shutter mechanism is moved from the closed position into the open position.

11. The device of claim 9, wherein the first and second assemblies include at least one bias member for restraining the shutter mechanism in the closed position, and the insertion of at least two plug blades urges the first and second assemblies to move in opposition to force exerted by the bias member, whereupon the shutter mechanism is moved to the open position.

12. The device of claim 11, wherein the first slide assembly includes a first shutter blade configured to seal the first aperture in the closed position, and the second slide assembly includes a second shutter blade member configured to seal the second aperture in the closed position.

13. The device of claim 12, wherein the insertion of plug blades simultaneously moves the first shutter blade member and the second shutter blade member such that each receptacle opening is in communication with a corresponding receptacle contact.

14. The device of claim 12, wherein the insertion of a foreign object against either the first shutter blade member or the second shutter blade member, but not both, does not cause the first shutter blade member and the second shutter blade member to simultaneously slide.

15. The device of claim 12, further comprising a first spring element coupling the first shutter blade member to the frame member.

16. The device of claim 15, wherein the first spring element is in tension in the closed position.

17. The device of claim 9, wherein the blade detection geometry includes at least one ramp disposed on a planar surface in one of the first or second slide assemblies, or both, wherein the ramp slidably disposes a plug blade inserted into the receptacle opening to open the shutter mechanism but does not slidably dispose a foreign object to open the shutter mechanism.

18. The device of claim 17, wherein the width of the foreign object is less than 75% of the width of a plug blade.

19. The device of claim 18, wherein the ramp surface is contoured such that foreign objects slip off of the ramp.

20. The device of claim 19, wherein the contoured surface is one of an arcuate, pointed, or ramped surface.

21. The device of claim 17, wherein the protective shutter mechanism further includes a second ramp disposed at a first end of the planar surface and a third ramp disposed at a second end of the planer surface.

22. The device of claim 21, wherein the first and second ramps include inclined surfaces that are substantially aligned one to another.

23. The device of claim 1, further comprising a miswiring sensor configured to sense a proper wiring condition.

24. The device of claim 23, wherein the miswiring sensor is coupled to the line terminals and the protective shutter mechanism, the miswiring sensor being configured to actuate the protective shutter mechanism from a locked state to the unlocked state in response to detecting the proper wiring condition.

25. The device of claim 1, further comprising a protective membrane integrated into the housing having at least one sealable hole portion, the protective membrane being substantially hermetically sealed when the sealable hole portion is in the closed position.

26. The device of claim 25, wherein the receptacle openings include openings configured to accommodate a plug ground contact blade, the protective membrane being substantially hermetically sealed when the plug ground contact blade is not inserted.

27. The device of claim 25, further comprising at least one manually operable button including an arm that passes through a sealable hole portion in the protective membrane, the sealable hole portion and the arm being substantially hermetically sealed.

28. The device of claim 27, further comprising feed-thru terminals configured to provide an electrical connection to a downstream receptacle, the at least one protective shutter being in the closed position when the power source is connected to the feed-thru terminals instead of the line terminals.

29. The device of claim 1, further comprising:
a fault detection circuit disposed on a circuit board, the fault detection circuit being configured to detect the at least one fault condition and provide a fault detect signal in response thereto; and
interrupting contacts coupled to the fault detection circuit and disposed between the line terminals and the at least one receptacle, the interrupting contacts being configured to disconnect the power source from the at least one receptacle in response to receiving the fault detect signal.

30. The device of claim 29, wherein the at least one fault condition is a ground fault whose detection by the fault detection circuit causes the interrupting contacts to disconnect the power source from the at least one receptacle in response to receiving the fault detection signal.

31. The device of claim 29, wherein the at least one fault condition is an arc fault whose detection by the fault detection circuit causes the interrupting contacts to disconnect the power source from the at least one receptacle in response to receiving the fault detection signal.

32. The device of claim 29, further comprising a miswiring detector that detects when voltage is connected to the feed-through terminals, the miswire detector including at least one resistor.

33. The device of claim 32, wherein the miswiring sensor includes at least one resistor.

34. The device of claim 33, wherein the proper wiring condition causes an amount of current to flow in the at least one resistor for at least a predetermined duration, such that the miswire circuit is opened and the protective shutter mechanism is moved from the locked position to the unlocked position.

35. The device of claim 34, wherein the proper wiring condition causes a current to flow for at least a predetermined duration, such that the resistor heats to a temperature greater than the melting point of solder, such that the miswire circuit is opened and the protective shutter is moved from the locked position to the unlocked position.

36. The device of claim 29, further comprising:
at least one pivot arm removably coupled to the protective shutter mechanism in the locked position; and
a cam member coupled to the at least one pivot arm, the cam member being configured to rotate around an axis of rotation to thereby move the at least one pivot arm in a linear direction to thereby move the protective shutter mechanism from the locked position to the unlocked position.

37. The device of claim 36, further comprising at least one spring member coupled to the protective shutter mechanism, the at least one spring member being configured to decouple the protective shutter mechanism from the at least one pivot arm when the pivot arm moves in the linear direction.

38. The device of claim 36, wherein the at least one pivot arm includes a first pivot arm coupled to the cam member and a second arm coupled to the cam member, the first pivot arm being removably coupled to a first protective shutter mechanism and the second pivot arm being removably coupled to a second protective shutter mechanism.

39. The device of claim 36, further comprising:
a rotor coupled to the cam member at a first end, and coupled to the circuit board at a second end; and
a torsion spring assembly coupled to the rotor and the miswiring sensor, the torsion spring assembly being configured to release stored mechanical energy when the miswiring sensor senses the proper wiring condition, such that the rotor causes the cam member to rotate about the axis of rotation to thereby move the at least one pivot arm in the linear direction.

40. The device of claim 29, further comprising a miswiring detector that detects a voltage connected to the feed through terminals.

41. The device of claim 40, wherein the miswiring detector includes at least one resistor coupled to a portion of the torsion spring assembly by a solder connection.

42. The device of claim 41, wherein the proper wiring condition causes a current to flow in the at least one resistor for at least a predetermined duration, such that the resistor heats to a temperature greater than the melting point of solder, such that the solder connection is broken, causing the torsion spring assembly to release the stored mechanical energy.

43. An electrical wiring device comprising:
a receptacle member including a housing and a cover assembly, the cover assembly including receptacle openings configured to accommodate plug blades;
a plurality of receptacle contacts disposed in the housing, each of the plurality of receptacle contacts coupled to a respective line terminal, each of the plurality of receptacle contacts being in communication with a corresponding receptacle opening; and
a protective shutter mechanism disposed within the receptacle member, the protective shutter mechanism including:
a shutter configured to include an opening corresponding to the hot contact and further including a blade detection geometry, the blade detection geometry including two spaced apart flexible members disposed at a first end of the shutter, the two spaced apart flexible members disposed proximate to the neutral contact, the shutter movable from a closed position to an open position upon the insertion of the plug contact blades, the shutter not being moveable from the closed position unless a plug contact blade simultaneously engages the two spaced apart flexible members; and
a biasing member disposed to position the shutter in the closed position absent the presence of an inserted plug contact blade.

44. The device of claim 43, further comprising:
a fault detection circuit disposed on a circuit board, the fault detection circuit being configured to detect the at least one fault condition and provide a fault detect signal in response thereto; and
interrupting contacts coupled to the fault detection circuit and disposed between the line terminals and the at least one receptacle, the interrupting contacts being configured to disconnect the power source from the at least one receptacle in response to receiving the fault detect signal.

45. The device of claim 44, wherein the at least one fault condition is a ground fault whose detection by the fault detection circuit causes the interrupting contacts to disconnect the power source from the at least one receptacle in response to receiving the fault detection signal.

46. An electrical wiring device comprising:
a receptacle member including a housing and a cover, the cover including receptacle openings configured to accommodate plug contact blades;
a set of receptacle contacts disposed in the housing, each of the receptacle contacts being in communication with a corresponding one of the receptacle opening;
a plurality of line terminals coupled to the set of receptacle contacts to thereby establish an electrical connection there between, the plurality of line terminals configured for connection to a power distribution system; and a protective shutter mechanism integrated into the housing, the protective shutter mechanism including,
 a frame member disposed in the housing, the frame member including a first aperture aligned with one receptacle opening, and a second aperture aligned with another receptacle opening,
 a shutter mechanism coupled to the frame member, the shutter mechanism including a first slide assembly corresponding to the first aperture and a second slide assembly corresponding to the second aperture, and
 a blade detection geometry disposed on at least one of the first slide assembly and the second slide assembly, the blade detection geometry being configured to move the shutter mechanism to the open position when both the first slide assembly and the second slide assembly are simultaneously engaged with plug blades having predetermined dimensional characteristics and not move the shutter mechanism otherwise.

47. The device of claim 46, further comprising:
 a fault detector coupled to the line terminals, the fault detector being configured to detect the at least one fault condition; and
 interrupting contacts disposed between the line terminals and the at least one receptacle, the interrupting contacts being configured to disconnect the power source from the at least one receptacle upon detection of the at least one fault condition.

48. The device of claim 47, wherein the at least one fault condition includes a ground fault condition.

49. The device of claim 47, wherein the at least one fault condition includes an arc fault condition.

\* \* \* \* \*